(No Model.)
C. W. LILLIE.
MOTOR FOR CHURNS.
No. 443,682. Patented Dec. 30, 1890.
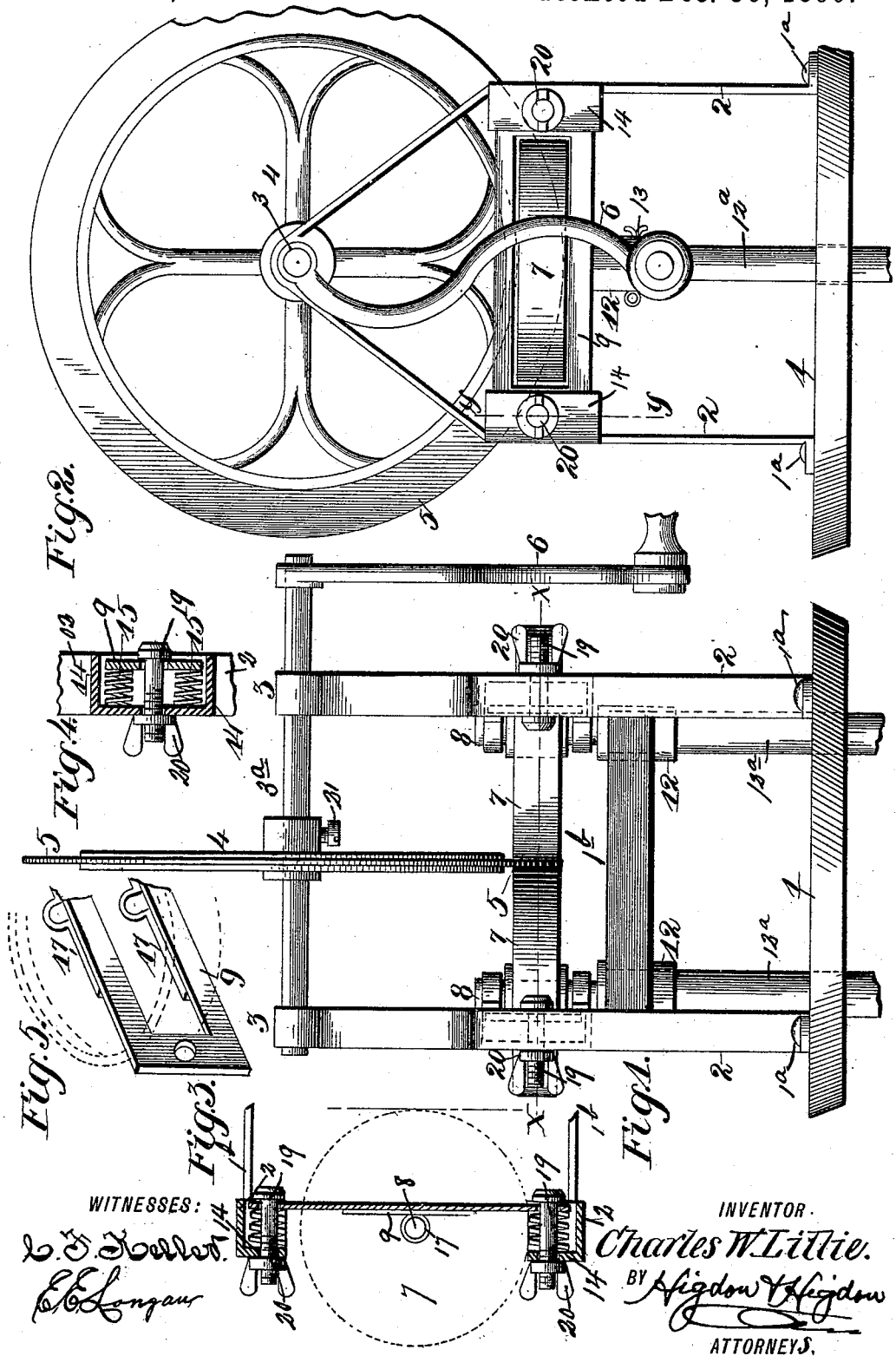
WITNESSES:
INVENTOR.
Charles W. Lillie.
BY Higdon & Higdon
ATTORNEYS.

UNITED STATES PATENT OFFICE.

CHARLES W. LILLIE, OF STAUNTON, ILLINOIS.

MOTOR FOR CHURNS.

SPECIFICATION forming part of Letters Patent No. 443,682, dated December 30, 1890.

Application filed August 21, 1890. Serial No. 362,636. (No model.)

*To all whom it may concern:*

Be it known that I, CHARLES W. LILLIE, of Staunton, in the county of Macoupin, State of Illinois, have invented a certain new and useful Improvement in Motors for Churns, of which the following is a full, clear, and exact description.

My invention relates to means whereby a rotary motion may be imparted to two churn-dashers from a single rotary wheel by means of friction-gearings; and it has for its object to provide a means whereby the friction-rollers may be pressed against the main driving-wheel with any desired force; and for this purpose it consists in the construction, arrangement, and combination of the parts of which it is composed, as will be hereinafter more fully described and claimed.

Referring to accompanying drawings, in which corresponding parts are designated by similar figures, Figure 1 is a front elevation of my invention. Fig. 2 is a side elevation thereof. Fig. 3 is a fragmental horizontal section on line $x$ $x$ of Fig. 1. Fig. 4 is a detail vertical section through the spring-boxes on line $y$ $y$ of Fig. 2. Fig. 5 is a detail fragmental view of the bearing-plate for the friction-rollers.

The frame 2 is formed of metal, and consists of a suitable bar thereof at each side of the frame, the opposite ends of the said bars being secured to the base 1 by suitable screws or bolts $1^a$, and being connected by the transverse brace-bars $1^b$, the center of the said bars being bent into an A shape and having bearings 3 secured in the apex thereof, through which bearings the shaft $3^a$ passes, the said shaft having at one end a crank 6, by which motion may be imparted thereto. The driving-wheel has secured on its periphery and extending outward therefrom the flange 5, and is adapted to slide upon the shaft and be secured at any desired point thereon by means of the clamping-screw 21.

Secured to the inner sides of each of the legs formed by the frame-bars 2 is a box 14, having its two inner sides open. A slotted bearing-plate 9 has its opposite ends contained within the two boxes on each side of machine, the said plates having bearings 17 above and below the center of the slot therein. A bolt 19 passes through each end of each of the said plates and also through the outer side of the boxes 14, and has thumb-nut 20 thereon, by which the plates 9 may be drawn toward the sides of the frame and away from the wheel 4, thus decreasing the bearing between the friction-roller carried by the said plate and the flange, while two springs 15 are above and below each of the said bolts 19, and contained between the outer side of the boxes 14 and the ends of the plate 9, thus taking up any slack that may be made by the nuts 20 and causing the rollers to bear upon the flange 5, when the said nuts are turned in such a manner as to give the said slack. A friction-roller 7 has its shaft 8 contained within the bearings of each of the said plates 9, and has its periphery normally held against the flange 5 of the wheel 4 by means of the springs 15, the base of each of the shafts 8 having a socket 12 formed thereon, in which sockets the dasher-rods $12^a$ of the churn are adapted to be secured by the split pins 13.

It will thus be seen that by rotating the wheel 4 and flange 5, carried thereon, that the roller 7, bearing thereon, will also revolve, imparting a corresponding motion to the dasher-rods $12^a$, and that by means of the screw 21 the wheel 4 may be moved to one side of the center of the shaft, and that the roller 7 on that side may be taken up and the roller upon the opposite side given out by means of the bolt 19 and thumb-nut 20, thus permitting the rollers to be varied to conform to any position of the churn-dashers.

Having thus described my invention, what I claim is—

A motor for churns, comprising a horizontal shaft, a driving-wheel adjustably mounted thereon and having a peripheral flange, a support at each side for the opposite ends of the said shaft, boxes secured to the inner faces of the said supports, a slotted bearing-plate at each side having its opposite ends contained in the boxes upon the same side, shafts having rollers thereon, the said shafts being carried by the said plates and having sockets thereon, the said rollers being contained within the slots in the said plates and bearing upon the flange upon the said wheel, a bolt passing through each end of each of the said plates and through the outer side of each of the said corresponding boxes, a thumb-nut on each of the said bolts, and a spiral
5 spring near each of the said bolts contained between the outer sides of the said boxes and the ends of the plates, as described.

In testimony whereof I affix my signature in presence of two witnesses.

CHARLES W. LILLIE.

Witnesses:
F. W. HEIDKAMP,
E. A. HEIDKAMP.